Patented Oct. 18, 1932

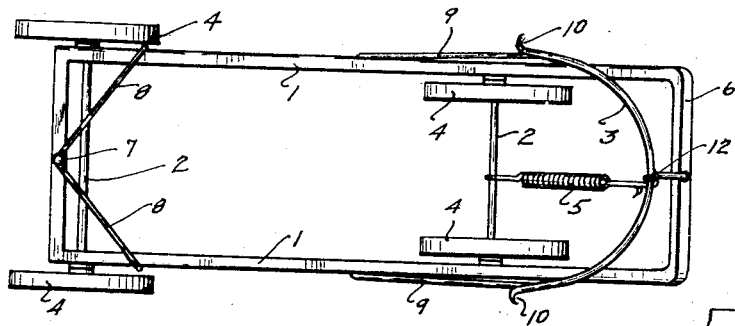
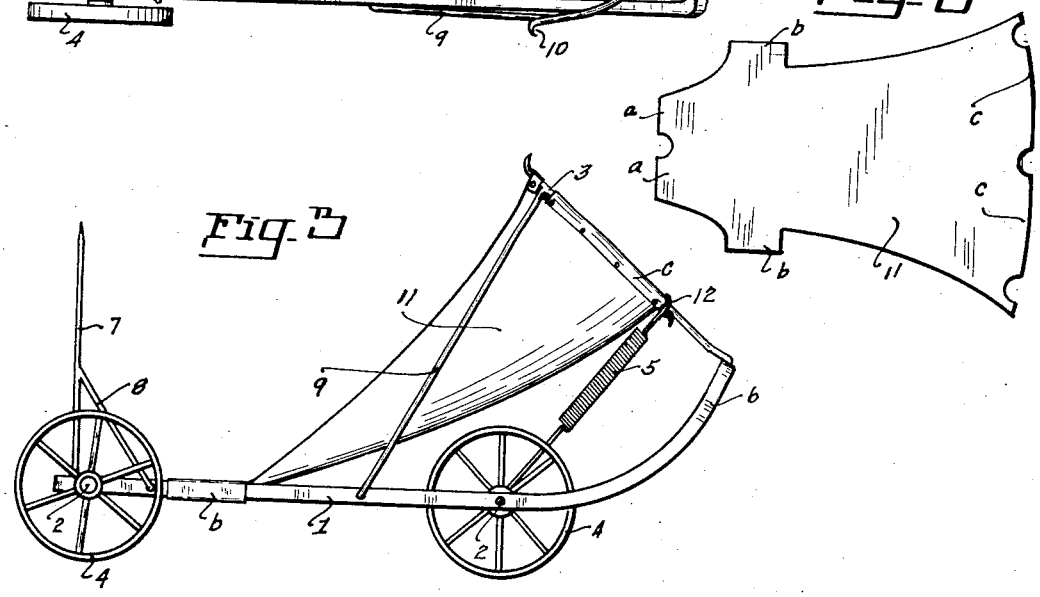
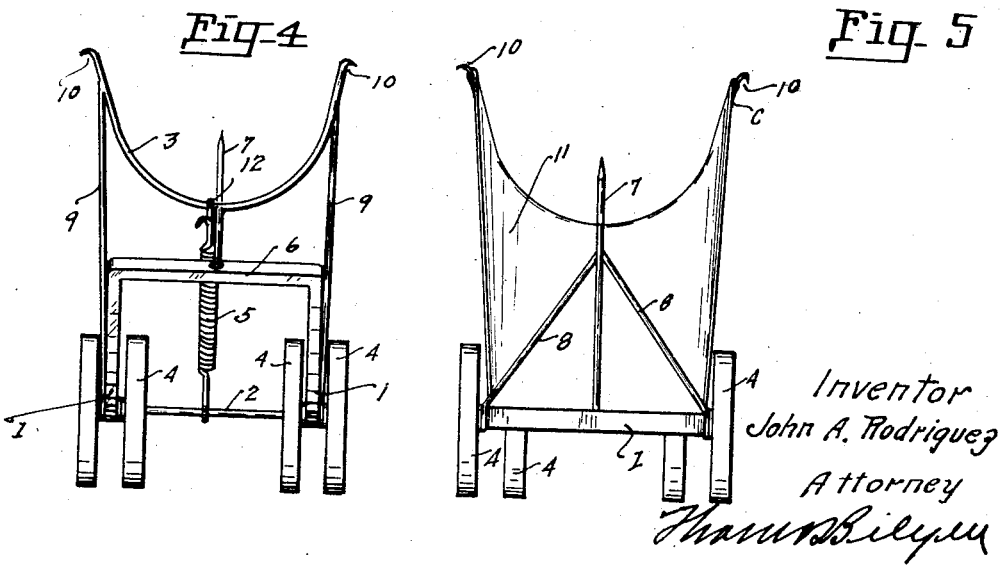

1,882,931

UNITED STATES PATENT OFFICE

JOHN A. RODRIGUEZ, OF PORTLAND, OREGON

APPARATUS FOR HOLDING THE SACK OPEN WHILE PICKING POTATOES OR ONIONS

Application filed May 8, 1930. Serial No. 450,719½.

This invention relates to an apparatus intended to maintain a sack in open condition with a structure that is a part of a vehicle that can be readily handled by the picker of potatoes or onions.

The primary object of my invention is to create a device that will save a great deal of time and energy for the user of the same.

A further object of my invention is to create a structure that is light in weight and of sufficient strength to permit the carrying of a substantial load.

A still further object of my invention is to provide means for maintaining a sack open and which creates an inclined surface of the position of the sack that is disposed on the vehicle so that the materials being picked will easily find their way to the bottom without undue agitation and damage to their outer skins.

In my experience in picking potatoes and onions I have found that the work is very tedious due to the crude manner in harvesting the crop. My present invention is designed to relieve the tediousness and do away with the waste of time in the harvesting of potato and onion crops.

With these and incidental objects in view, the invention consists in certain novel features of construction and combination of parts, the essential elements of which are set forth in the appended claim, and a preferred form of embodiment of which is hereinafter shown with reference to the drawing which accompanys and forms a part of this specification.

In the drawing:

Fig. 1 is a top plan view of my device illustrating the manner in which the wheels of the apparatus are placed within the frame.

Fig. 2 is a top view of the flooring that is disposed upon the framework of the vehicle showing its precise shape.

Fig. 3 is a side view of the device showing the exact position of the canvas flooring.

Fig. 4 is a front view of the device showing the main support for the canvas flooring.

Fig. 5 is a back view showing the means for holding empty sacks.

Like reference characters refer to like parts throughout the several views.

The apparatus consists essentially of a pair of sills 1, having a pair of axles 2, disposed transversely through the sills and in spaced relationship with each other.

A plurality of wheels 4 are disposed about the axles the front wheels being placed upon the axle on the inner sides of the front side of the sills and the rear wheels are disposed upon the axles on the outer sides of the rear side of the sills.

The sills and the axles may be fastened by any suitable means to form a rectangular chassis. A U-shaped support 3 composed of a leg downwardly extending therefrom and an arm at each end of the said support is disposed in spaced relationship with the chassis and secured thereto by braces 9 disposed on each side thereof and by having its leg secured to the handle 6 that is made integral with the chassis. Each of the arms of the support 3 has a hook 10 disposed at its end which is adapted to support the end of a sack. The support 3 is fixedly secured relative to the chassis and is disposed at an angle of 35 degrees from the vertical and the braces 9 are also slanted but in the opposite direction.

A resilient member 5 is secured to the front axle and to the lower portion of the U-shaped support. The end that is secured to the lower portion of the support 3 has a hook 12 which is adapted to hold that portion of the sack that is disposed upon the canvas flooring 11 which has one of its ends secured to the U-shaped support 3 and the opposite end secured to the rear axle 2.

On the rear end of the chassis, I place a rod 7 centrally of and vertically disposed thereto. Guy wires 8 are secured to the chassis and to the rod 7 in order to maintain the rod in fixed position. The end of the rod 7 is pointed and adapted to hold a number of empty sacks in reserve.

Referring to Fig. 2, the letter "*a*" designates the part that is attached to the rear axle 2, letter "*b*" designates the part that is attached to the sills 1 and letter "*c*" designates the part that is attached to the U-shaped support 3.

The canvas flooring may be attached to the framework by looping the parts designated by letters "*a*", "*b*" and "*c*" and sewing them about the respective body portions or by any other convenient manner.

I do not wish to limit myself to the use of canvas as it is evident that either metal or wood can be used with equal facility as a flooring.

The operation of this device is as follows:

The first thing the picker should do is to place a number of empty sacks (ten, fifteen or more of them) on the empty-sacks holder 7 of Fig. 3, letting the pointed end of said holder to stick through these sacks, its manner of holding these reserved sacks. Then take one sack and lay it flat on the canvas flooring 11 of Fig. 3; stick this same sack at its brim to the pointed end 10 of one arm of the carrier 4 of Fig. 4; draw the brim and stick it also to the pointed end 10 of the other arm of said carrier. With these two points of the brim of the sack fixed on the hooks 10 of the carrier, the rest of the brim is hanging down. This part of the brim that is hanging down is then held fast to the lower part of the carrier by the steel spring 5 which has at one end a hook 12 adapted to clip over said carrier, as may be seen in Fig. 4. With these three points of the brim of the sack being thus fixed, the sack is kept open and ready for service. And then the picker with his left hand takes hold of the apparatus by its handle 6, and with his right hand he picks the potatoes or onions, as the case may be, and throws them into this open sack. When the sack is full enough, it is taken off the apparatus and left behind on the picker's row. Take another empty sack and place it on the carrier, repeating the same operation as was done with the first one.

While the form of mechanism herein shown and described is admirably adapted to fulfill the object primarily stated, it is to be understood that it is not intended to confine the invention to the one form of embodiment herein shown and described, as it is susceptible of embodiment in various forms, all coming within the scope of the claim which follows.

What I claim is:

In a bag holding device to be used with a vehicle of the class described, a U-shaped support disposed at the front portion of the vehicle and inclined rearwardly therefrom, braces for maintaining said support in fixed position relative to the vehicle, said support having at its free ends hooks adapted for holding the open end of a sack in fixed position, a canvas flooring secured to the vehicle and to the U-shaped support, said flooring adapted to form an inclined surface rearwardly from the U-shaped support, and means disposed upon the lowermost portion of the U-shaped support for holding the lower portion of the open end of a sack in fixed position.

In testimony whereof I affix my signature.

JOHN A. RODRIGUEZ.